United States Patent [19]

Lovaas

[11] Patent Number: 5,067,766
[45] Date of Patent: Nov. 26, 1991

[54] TELESCOPING COVER FOR A PICKUP TRUCK BED

[76] Inventor: Olaf K. Lovaas, 2008 Westley Ct., Safety Harbor, Fla. 34695

[21] Appl. No.: 685,187

[22] Filed: Apr. 15, 1991

Related U.S. Application Data

[63] Continuation-in-part of Ser. No. 527,382, May 23, 1990, abandoned.

[51] Int. Cl.$^5$ ............................................... B60P 7/02
[52] U.S. Cl. .................................. 296/100; 296/220; 49/125
[58] Field of Search .................. 296/100, 220; 49/125

[56] References Cited

U.S. PATENT DOCUMENTS

| | | | |
|---|---|---|---|
| 3,342,523 | 9/1967 | Lutgen | 296/100 |
| 4,741,570 | 5/1988 | Lovaas | 296/100 |
| 4,770,461 | 9/1988 | Lovaas | 296/100 |

*Primary Examiner*—Margaret A. Focarino
*Assistant Examiner*—Andrew C. Pike
*Attorney, Agent, or Firm*—Stanley M. Miller

[57] ABSTRACT

A pair of telescoping panels covers the bed of a pickup truck. An axle member at the trailing end of the rear panel is biased to lift that trailing end upwardly so that it can clear the tailgate of the truck when a latch is released and so that the rear panel can be slid forwardly when so released. A latch at the leading end of the forward panel similarly releases an upwardly biased axle so that the leading end of that panel can clear the forward wall of the truck bed when it is desired to slide the front panel rearwardly. A third axle is positioned at the leading end of the rear panel. All three axles carry wheel members at their opposite ends that are mounted for lateral movement within longitudinally extending tracks mounted to opposite side walls of the truck bed. The lateral moveability allows the structure to be positioned on differing models of pickup trucks. The panels are arched and ribbed for structural strength.

16 Claims, 8 Drawing Sheets

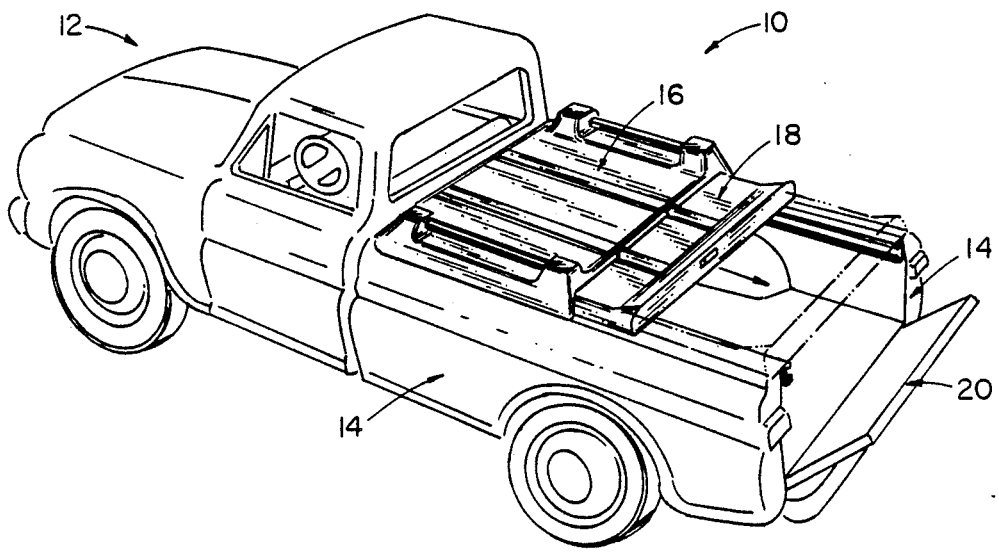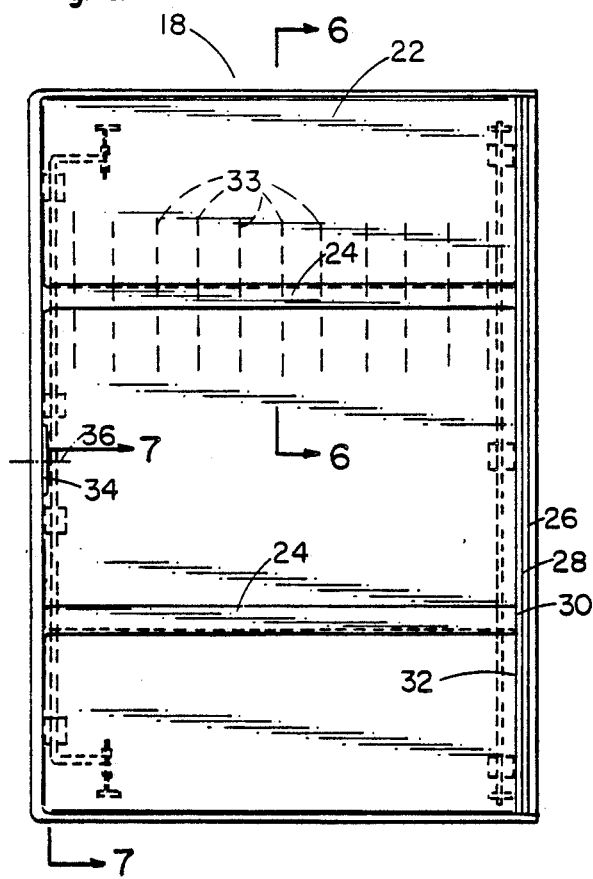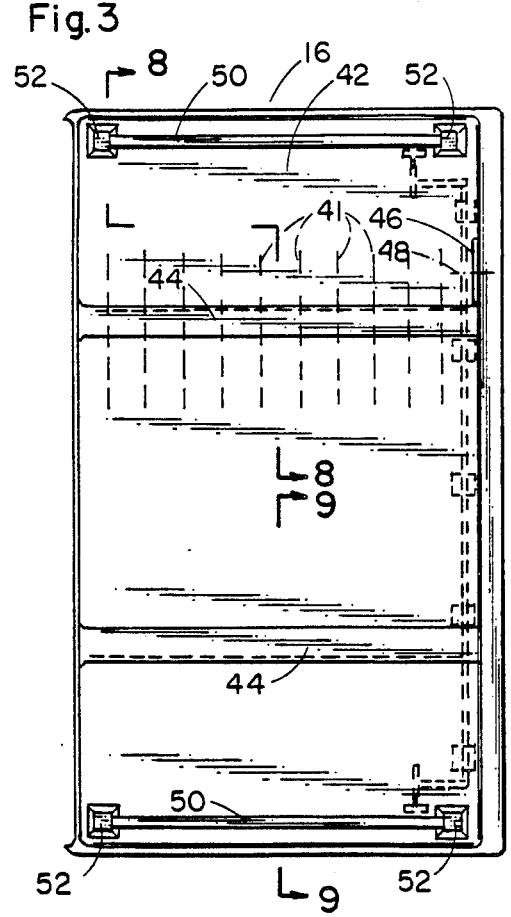

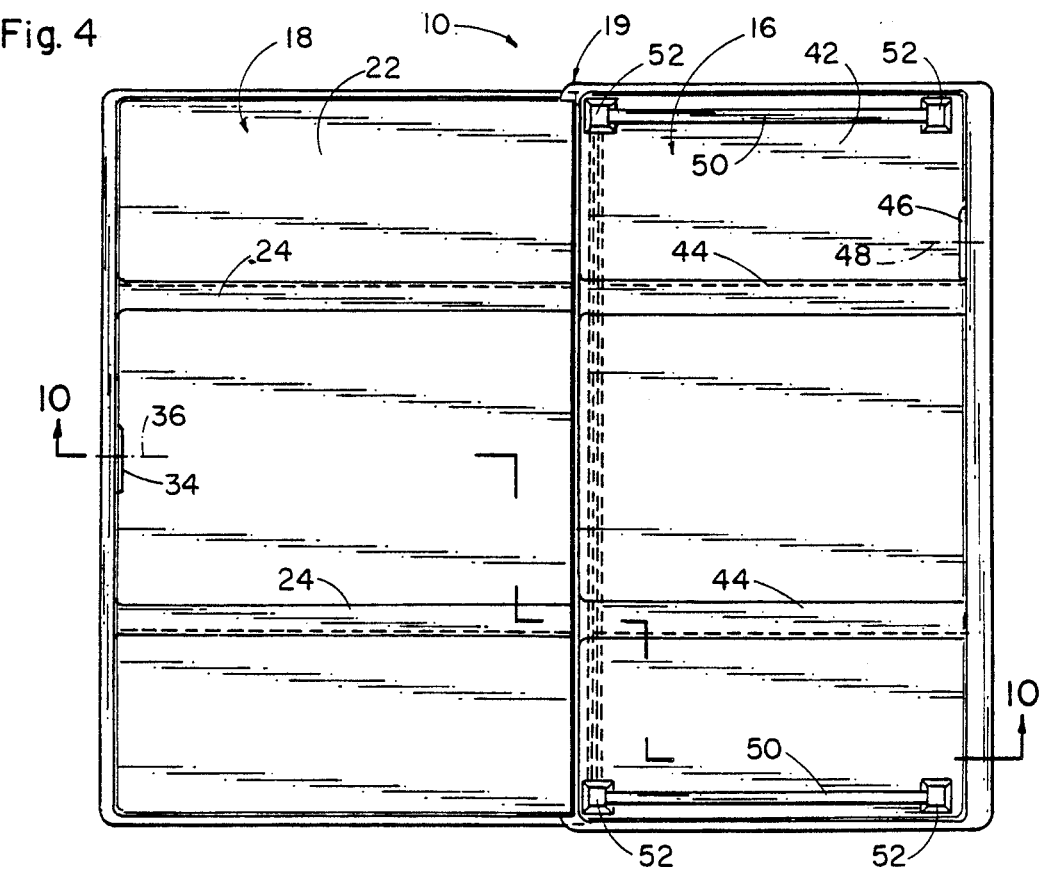
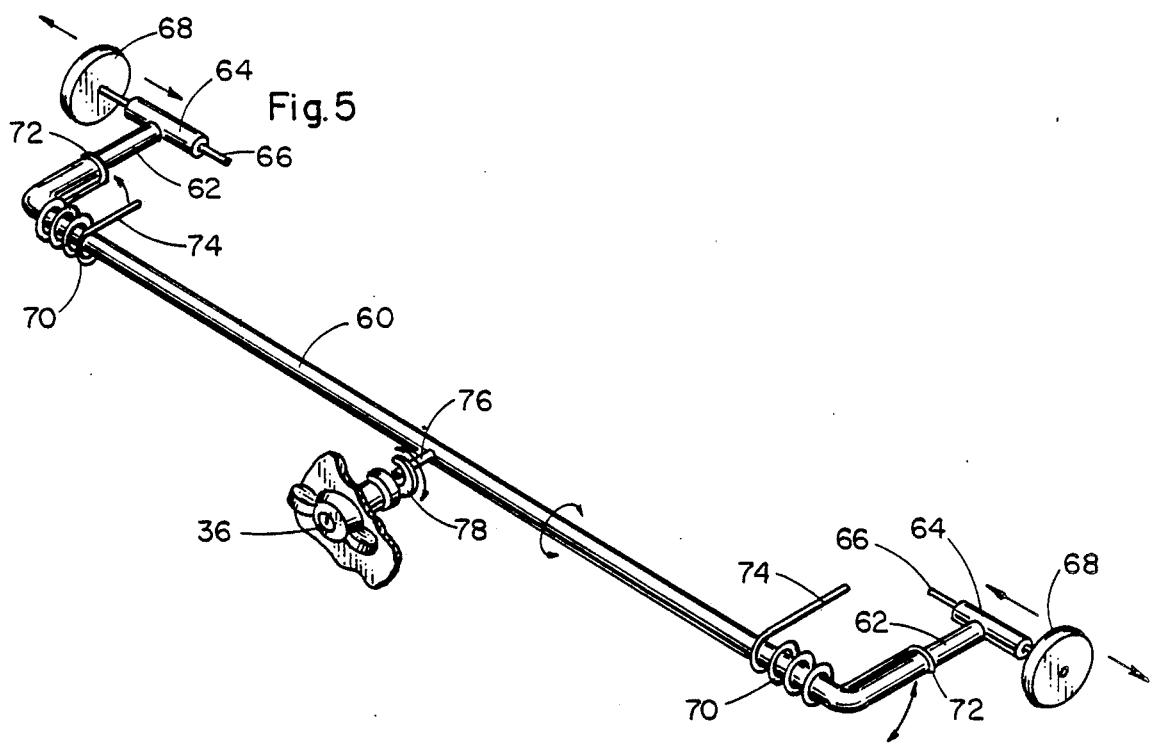

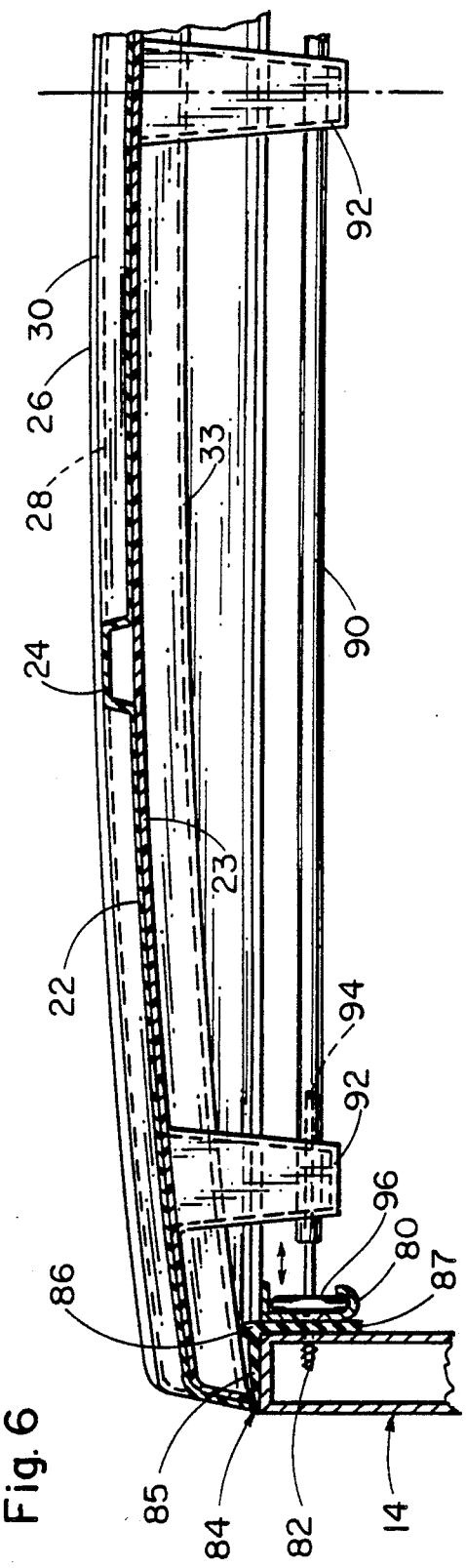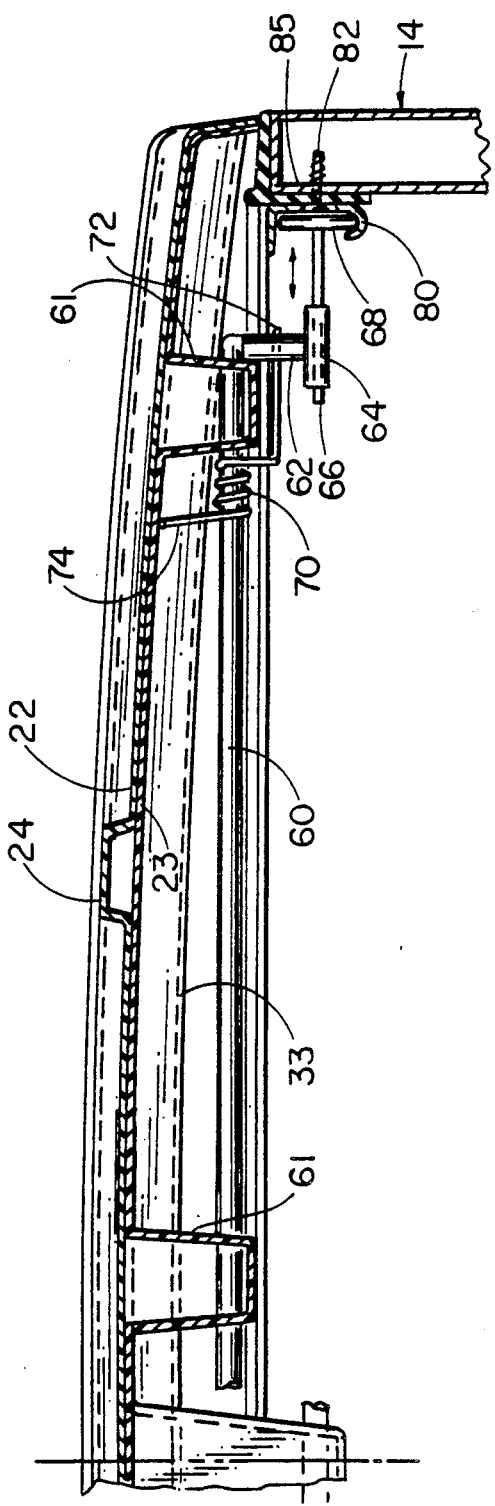

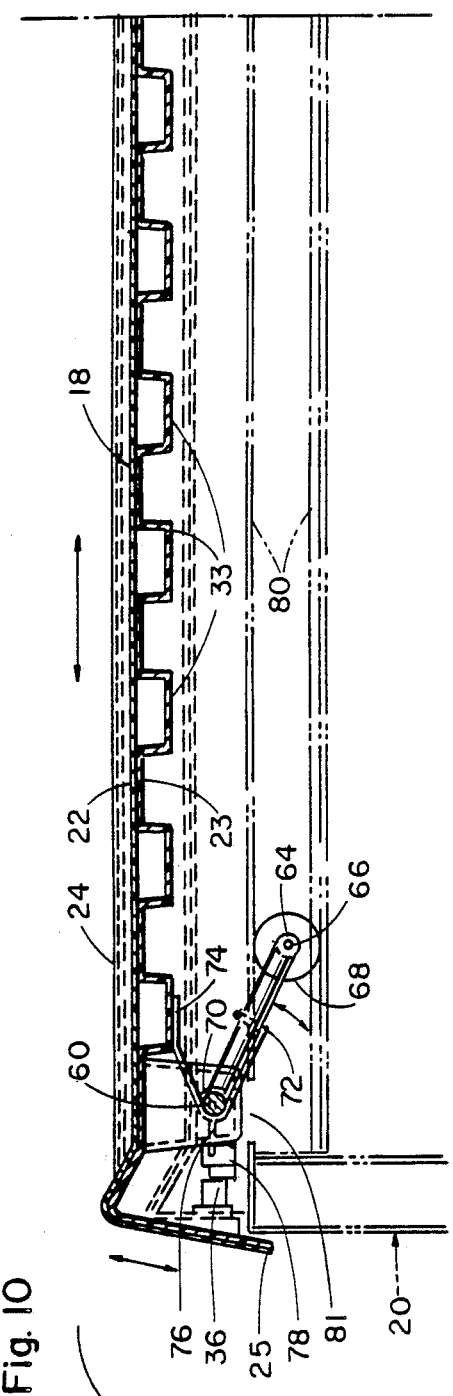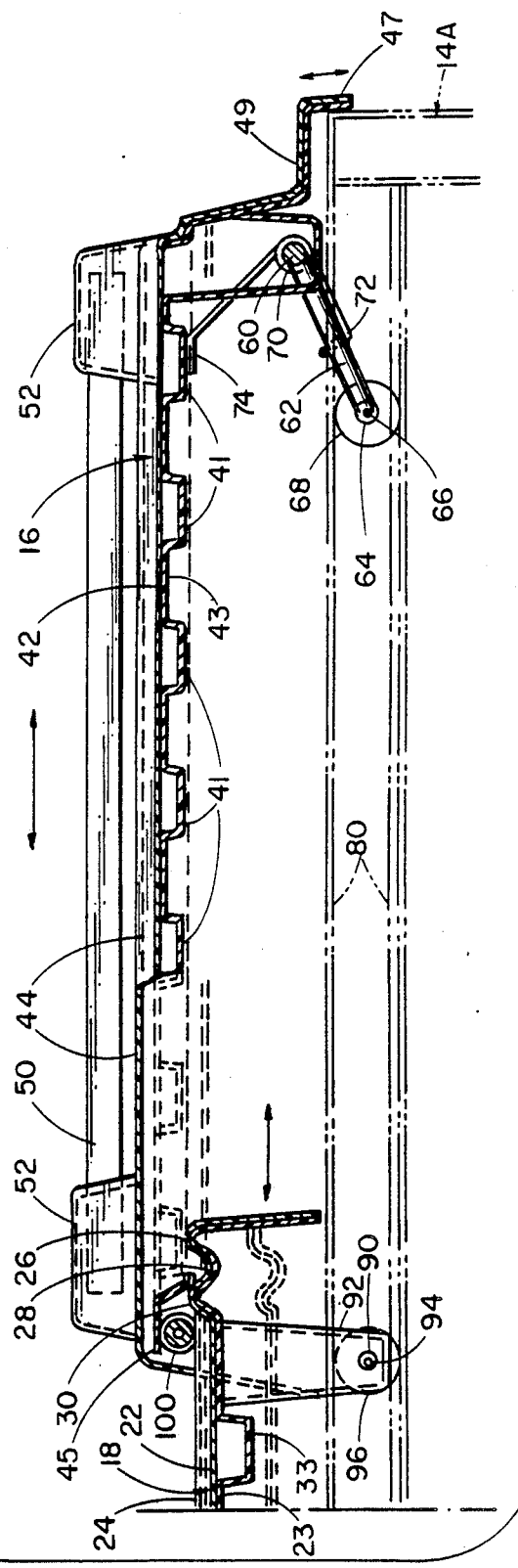
Fig. 10

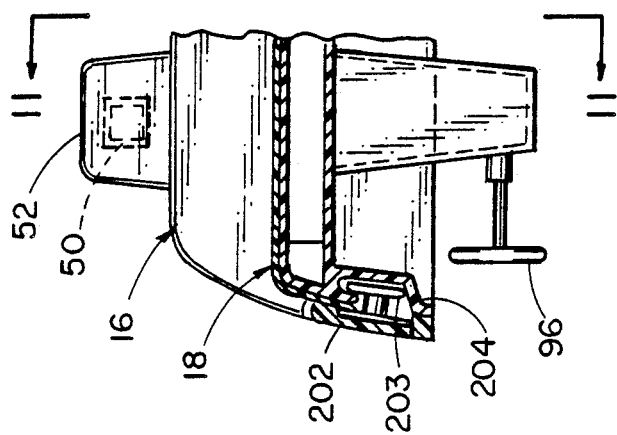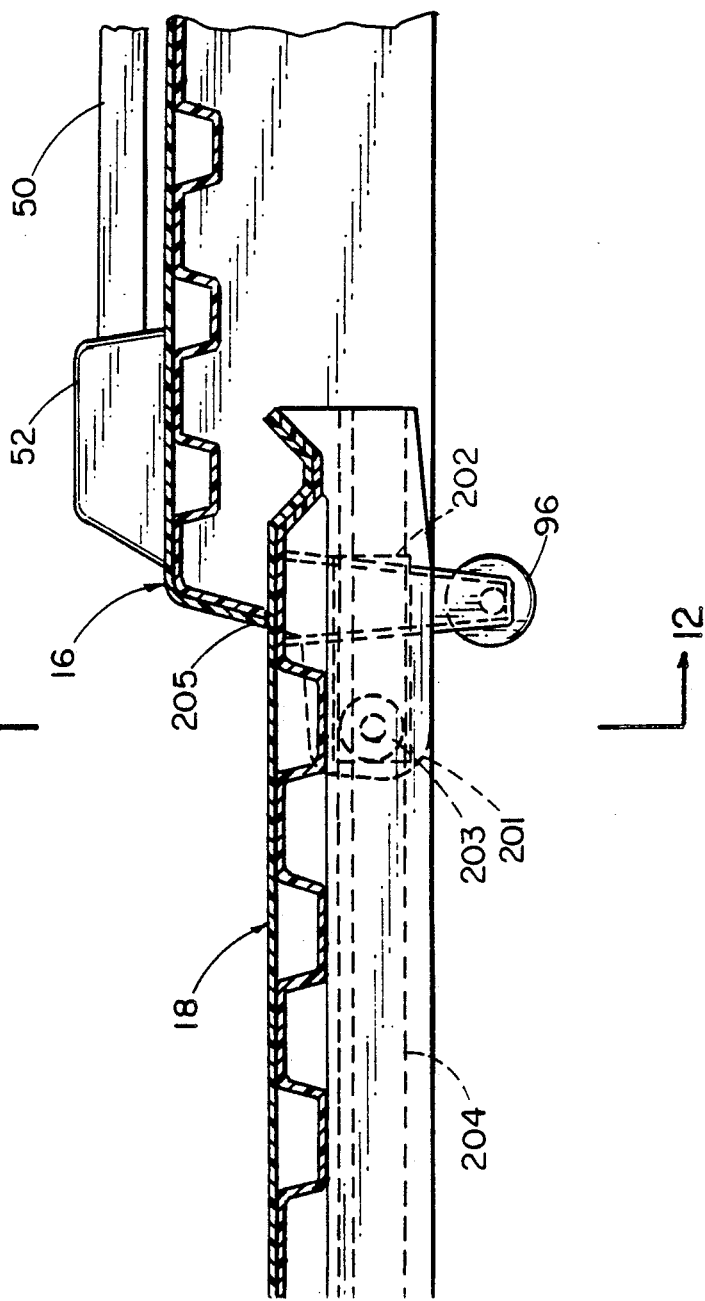

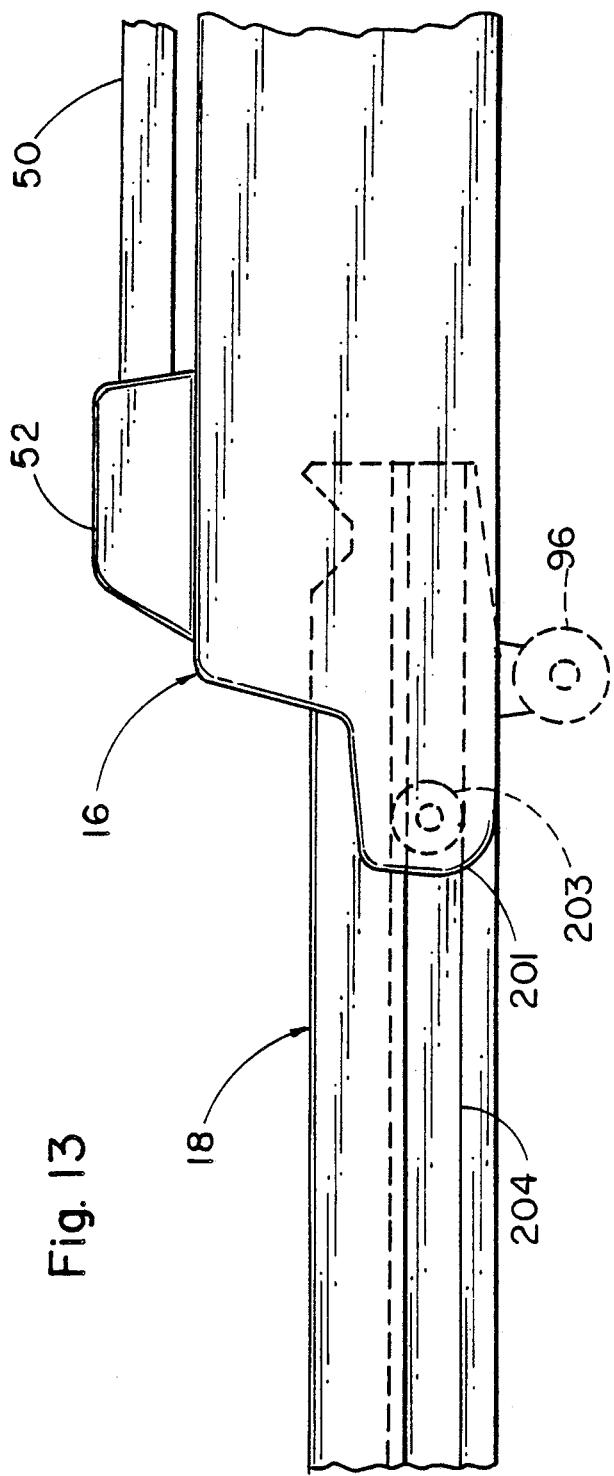

TELESCOPING COVER FOR A PICKUP TRUCK BED

CROSS-REFERENCE TO RELATED APPLICATIONS

This disclosure is a continuation-in-part of a copending disclosure of the same title by the same inventor, bearing serial number 07/527,382, filed May 23, 1990, now abandoned.

BACKGROUND OF THE INVENTION

1. Field of the Invention

This invention relates, generally, to covers for pickup truck beds. More particularly, it relates to a telescoping cover that is securely locked at its leading end, middle end, and trailing end when fully extended and which fits truck beds of differing widths.

2. Description of the Prior Art

Pickup truck beds are open to the elements and thus have little utility in inclement weather. Numerous bed covers have been devised to cover the bed, but few have met with acceptance in the marketplace. Consumer resistance to the heretofore known bed covers is primarily attributable to the high cost of the product. The high cost, in turn, is attributable to the complexity of the available structures, and this complexity drives up the price of the units available.

The known bed covers also suffer from more serious problems as well. They are often built such that they lack structural integrity, for example. Many of the known bed covers have flat tops, and as such the tops are unable to support heavy loads. Although bed covers are not intended to be used as support surfaces in the first place, consumers do use them as such and are disappointed when their covers collapse under the weight of articles piled thereatop.

Another serious shortcoming of prior art bed covers is their lack of versatility. Many customers purchase a bed cover that fits the truck they own and assume it will also fit other trucks they may buy in the future. However, truck manufacturers do not have any standards to which they collectively subscribe. Accordingly, the customer who purchases a particular bed cover may not be able to use it on any other truck, including a later model of the same truck.

Some early bed covers have also been known to lift off and fly away from the truck at high speeds, due to the airfoil-like design of such covers.

Other bed covers have been known to fly off even at low speeds, due to the poor latches provided thereon.

Accordingly, there is a need in the pickup truck bed cover industry for a bed cover of simple yet elegant design that can be manufactured at a cost that translates into an affordable price at the retail level of distribution. The inexpensive design should nonetheless provide a cover having substantial structural integrity in case it is used in a manner inconsistent with its intended usage. Moreover, there is a need for a truck bed cover that is easily installed and just as easily locked into place at its leading and trailing ends.

However, the prior art, taken as a whole, neither teaches nore suggests how the limitations of the prior art pickup truck bed covers could be overcome in a cost-effective manner.

SUMMARY OF THE INVENTION

The longstanding but heretofore unfulfilled need for a vastly improved pickup truck bed cover is now provided in the form of a two part bed cover featuring a forward panel, a rearward panel that is telescopically received under the forward panel, lateral adjustment means that allows the structure to be fitted on over a dozen different pickup truck models, lock means that securely holds the leading end of the forward panel to the leading end of the truck bed and the trailing end of the rearward panel to the tailgate, and arched overall structure for structural strength, and many other features as well.

An elongate track extends along each inner side wall of the truck bed, and roller members rotatably mounted at opposite ends of forward, middle, and rearward axles of unique design are received within their associated tracks. The rollers are laterally moveable so that they can adjust to differing widths within a single truck bed or between the different widths of different truck beds.

There are a total of three axles in the novel structure. Specifically, the rear panel has an axle at its leading end and an axle at its trailing end. The forward panel has an axle at its leading end only.

The axles at the trailing end of the rear panel and the forward end of the forward panel are "U"-shaped. They are positioned in underlying relation to their associated panel ends and are biased upwardly so that they exert an upward force on the trailing end of the rear panel and the leading end of the forward panel, respectively.

A latch at the trailing end of the rear panel holds the rear axle in a horizontal plane until it is unlocked. Once unlocked, springs urge the main part of the axle to rotate upwardly, thereby lifting the trailing edge of the rear panel so that it can clear the tailgate and so that the tailgate can be unlocked.

Similarly, a latch at the forward end of the forward panel holds the forward "U"-shaped axle in a horizontal plane as long as it is locked. Once unlocked, springs urge the forward axle to lift the leading end of the forward panel so that it clears the front wall of the truck bed and can be slid rearwardly. Thus, the latches securely hold the panels in place until it is desired to open the truck bed, and the latches, once released, release the bias means to thereby lift the end of the panel sought to be displaced.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a perspective view of a pickup truck equipped with an exemplary embodiment of the present invention;

FIG. 2 is a top plan view of the rear panel;

FIG. 3 is a top plan view of the forward panel;

FIG. 4 is a top plan view of the forward and rearward panels when in their fully extended configuration;

FIG. 5 is a perspective view of the rear axle of this invention, the forward axle having the same construction;

FIG. 6 is a sectional view taken along line 6—6 in FIG. 2;

FIG. 7 is a sectional view taken along line 7—7 in FIG. 2;

FIG. 10 is a split sectional view taken along line 10—10 in FIG. 4;

FIG. 11 is a sectional view of a second embodiment of the invention, taken along line 11—11 in FIG. 12;

FIG. 12 is a view taken along line 12—12 in FIG. 11; and

FIG. 13 is a side elevational view of the parts shown in FIG. 11, as viewed from the opposite perspective of FIG. 11.

Similar reference numerals refer to similar parts throughout the several views of the drawings.

DETAILED DESCRIPTION OF THE PREFERRED EMBODIMENT

Figure 1A:
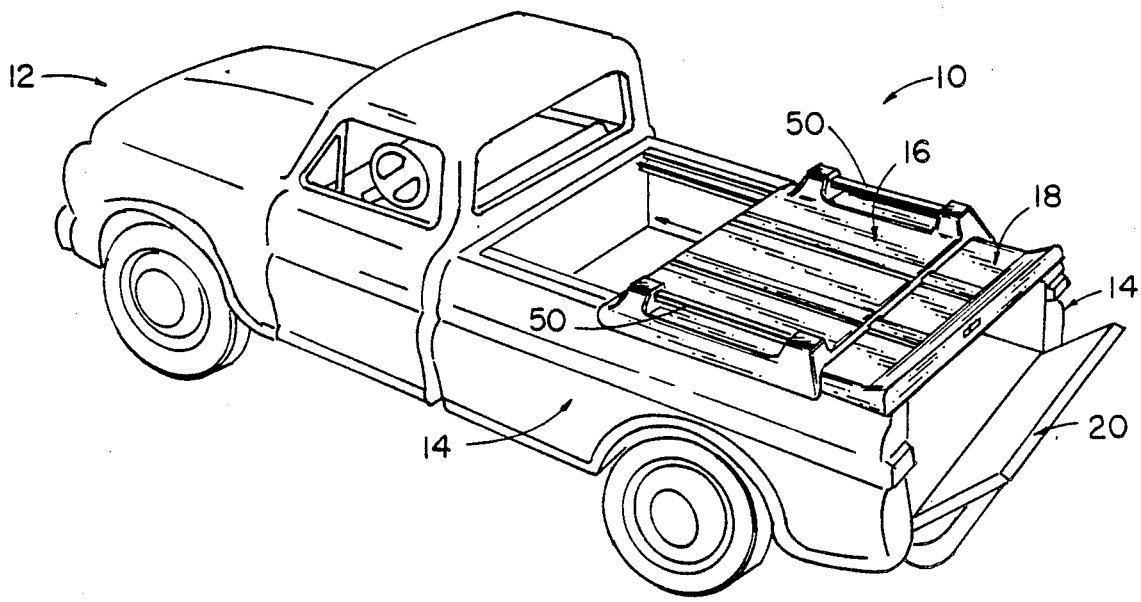
FIG. 1A is a perspective view similar to FIG. 1 but showing the forward panel slid rearwardly.

Referring now to FIG. 1, it will there be seen that an illustrative embodiment of the invention is denoted as a whole by the reference numeral 10. Cover 10 is shown installed on a pickup truck 12 having a pair of laterally spared apart, upstanding sidewalls 14.

The forward panel of the novel cover is denoted 16, generally, and the rearward panel is denoted 18, generally. Rearward panel 18 is shown in a forward position where it is telescopically received beneath forward panel 16, but it should be understood from the outset that forward part 16 can be slid rearwardly over part 18 as well.

As shown in FIG. 2, rearward panel 18 includes a main body 22 having a pair of longitudinally extending, transversely spaced raised ribs 24 formed in a top wall thereof. These ribs greatly enhance the structural integrity of the panel.

A rain gutter 28, shown in FIG. 2 but best shown in FIG. 10, is formed in the leading end 26 of the rearward panel 18. More particularly, the gutter 28 is positioned as shown in trailing relation to a raised leading lip 30 and in leading relation to a trailing raised lip 32.

Dotted lines 33, also shown in FIG. 2 but best understood in connection with FIG. 10, are internal transversely disposed, longitudinally spaced ribs formed by an inner liner of the same material as the main body 22. Both forward and rearward panels 16 and 18 are formed of an outer and inner skin of laminated plastic. Said panels may be of glass fiber construction with baked in reinforcements where needed.

Recess or depression 34 (FIG. 2) is centered at the trailing edge of rearward panel 18. It receives a lockable latch 36 that maintains the rear "U"-shaped axle in a horizontal plane as long as the latch is locked.

Referring now to FIG. 3, it will there be seen that the main body of the forward panel 16 is denoted 42. It has raised longitudinal ribs 44, best shown in FIG. 8, and internal transverse ribs 41, best shown in FIG. 10, formed by an inner liner as in the rearward panel. Note that the rearward panel ribs 24 are disposed in longitudinal alignment with the forward panel ribs 44 and that the rearward panel ribs are complementally formed with respect to the forward panel ribs and are telescopically received therewithin.

An indentation 46 is positioned at the leading end of panel 16, on the driver's side of truck 12 for the convenience of the operator. It receives lockable latch 48. Latch 48, when locked, holds the forward "U"-shaped axle in a horizontal plane.

Longitudinally extending decorative handle rails 50 perform the function their name implies and are positioned in parallelism with one another at opposite sides of forward panel 16. Their opposite ends are mounted in bosses 52 which are intergral with main body 42 and which project upwardly therefrom. They are not intended for use as tie downs.

FIG. 4 show forward and rearward panels 16 and 18, respectively, when fully extended and mounted atop the bed walls 14. The trailing end of forward panel 16 overlies the leading end of rear panel 18 as indicated by the reference numeral 19.

The perspective view of FIG. 5 shows the unique "U"-shaped axle 60 having legs 62 that end in a "T"-shaped junction 64 through which axles 66 for roller wheels 68 are mounted. It should be noted that these axles 66 are slideably mounted within bosses 64 to provide lateral movement thereof as denoted by the oppositely pointing directional arrows. Pickup truck beds often taper from the forward end of the bed to the rearward end, and the slideable mounting of roller wheels 68 accommodates such taper as needed. More importantly, truck manufacturers make beds of differing widths. The lateral movement of wheels 68 is sufficient to allow the novel construction to fit over a dozen different truck bed widths.

A pair of laterally spaced apart torsion springs 70 axially receive axle 60. Each spring 70 has an outer end that curls around and which is engaged with leg 62 as at 72, and an inner end 74 that bears upon the underside of its associated panel 16 or 18. The inner end 74 as depicted in FIG. 5 bears against the underside of trailing panel 18, although it should be understood that in a mirror image of FIG. 5, said inner ends 74 would extend in the opposite direction and would bear against the underside of forward panel 16. Rear torsion springs 70 as depicted in FIG. 5 urge the trailing end of rear panel 18 upwardly an inch or more, and those springs in their mirror image counterpart axle at the leading end of the forward panel 16 likewise urge the leading end of said forward panel 16 upwardly an inch or more. This allows a forward lip on the forward panel 16 and a rearward lip on the rear panel 18 to clear the ends of the truck bed when the axles are unlatched, i.e., the forward lip, not shown in FIG. 5, covers the forward ends of the truck bed wall, thereby forming a rain drip, and the rearward lip extends over the top of the tailgate, thereby forming a locking edge.

Pin 76 is mounted to axle 60 at its midpoint and extends perpendicularly therefrom as shown. Latch 78 of lock 36 engages said pin 76. When latch 78 swings over pin 76, rear panel 18 cannot be lifted over the rear lip and slid forwardly. A similar arrangement is provided at the leading end of the forward panel 16 and lifting of said forward panel over the forward lip is precluded when the latch 78 is so swung over pin 76. The forward lock assembly 48 is offset to the driver's side of the bed as mentioned earlier, but in all respects the structure and operation of the forward lock assembly is the same as the depicted rear lock assembly.

An inner liner 23 just below top wall 22 of rear panel 18 is shown in FIG. 6.

Track 80, within which roller wheels 68 ride, is shown fastened to the inside wall of bed sidewall 14 by a sheet metal screw 82 in FIG. 6, it being understood that there are a plurality of said screws 82 positioned along the length of said track 80. It should be understood that track 80 is a single unit, extruded from metal or plastic. It is intended to carry the rollers and to shelter them from the rain and other elements. lip on the forward panel 16 and a rearward lip on the rear panel 18 to clear the ends of the truck bed when the axles are unlatched, i.e., the forward lip, not shown in FIG. 5, covers the forward ends of the truck bed wall, thereby forming a rain drip, and the rearward lip extends over the top of the tailgate, thereby forming a locking edge.

Pin 76 is mounted to axle 60 at its midpoint and extends perpendicularly therefrom as shown. Latch 78 of lock 36 engages said pin 76. When latch 78 swings over pin 76, rear panel 18 cannot be lifted over the rear lip and slid forwardly. A similar arrangement is provided at the leading end of the forward panel 16 and lifting of said forward panel over the forward lip is precluded when the latch 78 is so swung over pin 76. The forward look assembly 46 is offset to the driver's side of the bed as mentioned earlier, but in all respects the structure and operation of the forward lock assembly is the same as the depicted rear lock assembly.

An inner liner 23 just below top wall 22 of rear panel 18 is shown in FIG. 6.

Track 80, within which roller wheels 68 ride, is shown fastened to the inside wall of bed sidewall 14 by a sheet metal screw 82 in FIG. 6, it being understood that there are a plurality of said screws 82 positioned along the length of said track 80. It should be understood that track 80 is a single unit, extruded from metal or plastic. It is intended to carry the rollers and to shelter them from the rain and other elements.

An elongate plastic gasket or rain guard 84 having protuberance 86 includes a horizontal part 85 and a vertical part 87. The horizontal part overlies the top edge of side wall 14 and the vertical part 87 is sandwiched between track 80 and the inner wall of side wall 14 as shown. Since FIG. 6 depicts the forward end of the rear panel 18, rigidly mounted, linear in configuration axle 90 is seen mounted in elongated bosses 92 of which there are three in the leading end of rear panel 18.

Wheels 96 are rotatably mounted upon axles 94, and axles 94 are slideably received within opposite ends of axle 90, for the same reason that axles 66 are mounted in bosses 64 as set forth in the description of FIG. 5, i.e., the telescoping mounting allows lateral movement of wheels 96 when the sides of the truck bed taper inwardly toward the end of the truck or when the novel panels are installed on truck beds of differing widths.

The rear part of rear panel 18 is depicted in FIG. 7. Track 80 is mounted upon side wall 14 by sheet metal screws 82, and rain guard unit 84 is positioned between the bed side wall 14 and said track 80. Axle 60 and its associated parts, as depicted in FIG. 5, also appear in FIG. 7. Bosses 61 rotatably mount said axle 60. It should be noted that bosses 61 have less vertical extent than bosses 92 of the forward rigid axle 90 of FIG. 6.

It should also be observed that rear panel 18, as shown, is crowned or sloped downwardly from its middle in order to allow rain to run off therefrom. More importantly, this arch provides enhanced structural strength that protects the bed cover if it is misused. Forward panel 16 is arched for the same reason.

Figure 8:
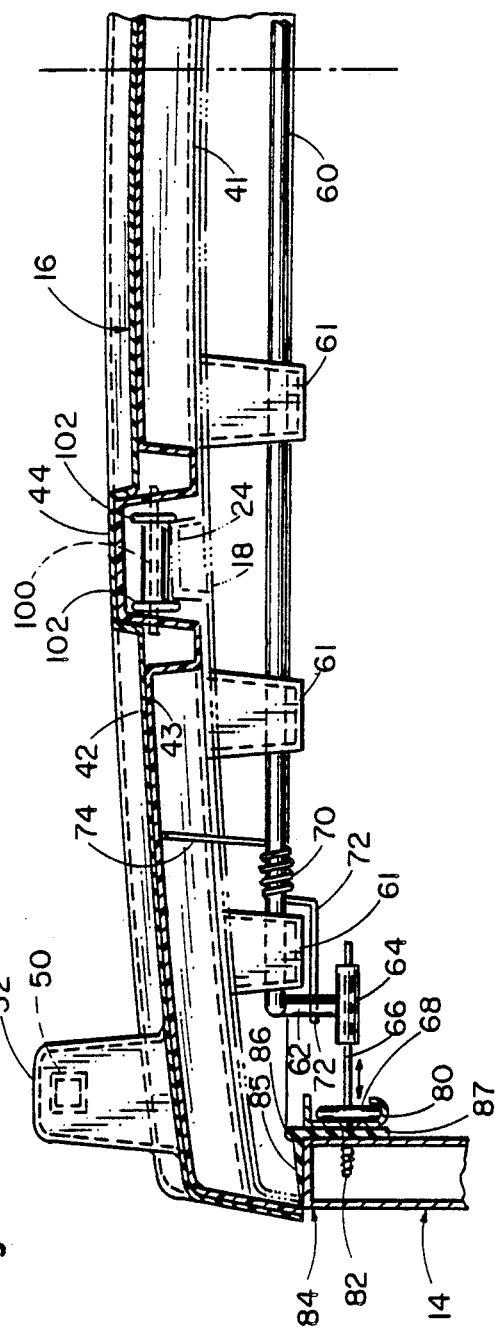
FIG. 8 is a sectional view taken along line 8—8 in FIG. 3.

As shown in FIG. 8, forward panel 16 has a top skin 42 as previously pointed out, and an inner skin 43. Most of the parts shown in FIG. 8 have been previously described. Rear panel 18 is shown in phantom lines to show how forward panel 16 fits over rear panel 18. It will be noted, e.g., that longitudinal rib 24 of rear panel 18 provides a track upon which roller 100 rides. Roller 100 is flanged, having flanges 102 at its opposite ends to maintain forward panel 16 in alignment with rear panel 18. A metal retaining clip, not shown in FIG. 8, extends over roller 100 to preclude lifting of the illustrated part of the panel when the latch is closed.

Figure 9:
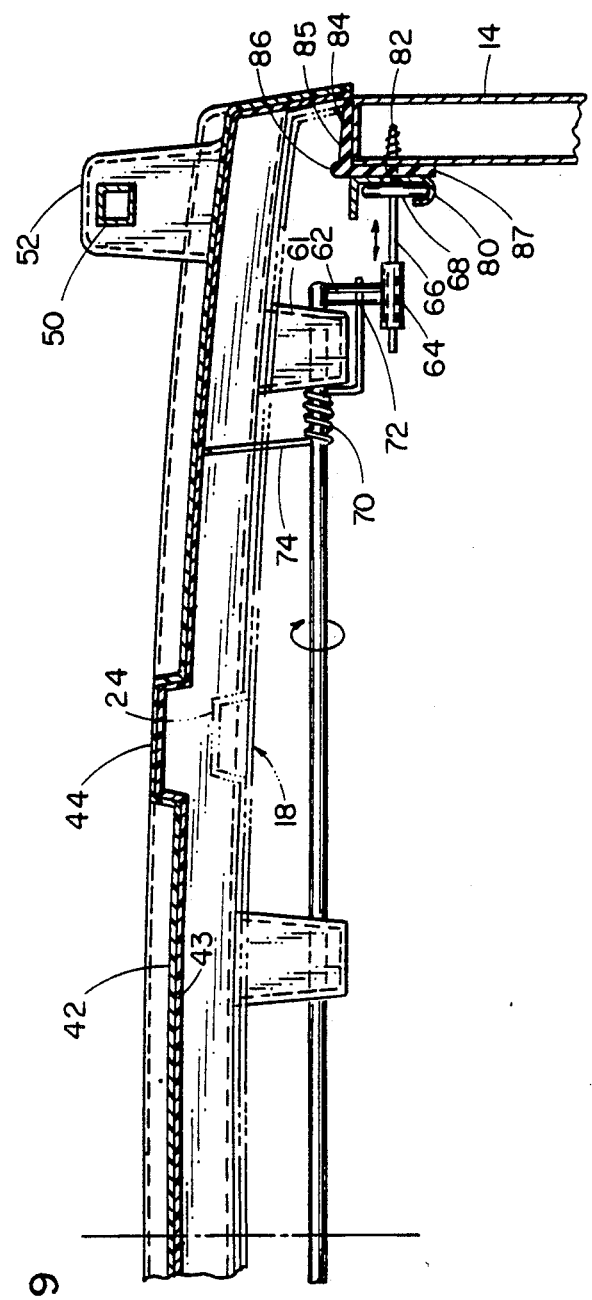
FIG. 9 is a sectional view taken along line 9—9 in FIG. 3.

FIG. 9 also depicts previously-described parts. Roller 100 is not visible in the FIG. 9 view because said roller 100 is positioned only in the rear part of the forward panel 16.

Turning now to FIG. 10, reference numeral 81 at the left side of the top half of said FIG. denotes a wheel-receiving access opening 81 formed in the rear part of each track 80, which opening performs the function its name implies. This is the only location where the wheels can be inserted into the tracks. Thus, to install the novel panels, the wheels 68 of the front panel 16 are inserted into track 80 through opening 81 and said panel is slid forwardly until said wheels are positioned at the forward end of the bed as shown at the right hand side of the bottom half of FIG. 10. Wheels 96 of the forward axle 90 of the rear panel 18 are then inserted through opening 81 and that panel is then slid into the position shown at the left hand side of the bottom half of FIG. 10. Finally, rear wheels 68 shown in the left hand part of the top part of FIG. 10, are inserted through opening 81. The rear part of the front panel 16 is then lifted and the leading edge of the rear panel 18 is slid thereunder as is best understood in connection with the left hand part of the lower part of FIG. 10.

Detent 45, as shown at the just-mentioned part of FIG. 10, is attached as at 45A within rain gutter 28, and this latch 45 extends over roller 100 as shown. It is therefore seen that with wheels 96 engaged in track 80, it is impossible to raise the trailing end of the forward panel 16 because detent 45 precludes said raising. This provides an intermediate latch down of the two panels. It should be understood that the lifting of the rear part of the front panel 16 as mentioned in the preceding paragraph is accomplished before the leading end of the rear panel 18 is brought under the rear part of the forward panel, i.e., said forward panel lifting is accomplished during initial assembly of the novel apparatus only; after the leading end of the rear panel has been installed under the trailing end of the forward panel, detent 45 precludes subsequent lifting of the trailing end of the forward panel, as aforesaid.

Lip 47 at the leading end of forward panel 16, as shown in the right hand corner of the lower half of FIG. 10, rides over the forward end wall 14A of the truck bed and provides a rain-tight seal and precludes rearward sliding of the forward panel as the forward offset latch is locked. Horizontal wall 49 provides space adequate to receive an operator's hand when a keyed latch, not shown in FIG. 10, is opened or closed.

Lip 25, shown at the left hand side of the upper half of FIG. 10, overlies tailgate 20 as shown and provides a rain-tight seal at that location. It also precludes forward sliding of the rearward panel when the rear latch is locked.

The "U"-shaped configuration of the front and rear axles allows these lips to be raised sufficiently high to allow sliding movement of the front and rear panels when the forward and rear latches are unlocked. More particularly, the upward bias on the main part of the axles lifts the panels as aforesaid to provide clearance for the lips, but that upward bias is made available only upon unlocking of the latch members as aforesaid.

A finger or thumb screw-tightened attachment or bracket, not shown, that slips over the upper part of track 80 and which can be located as the operator desires to preclude the rearward motion of the rearward panel or the forward motion of the forward panel when in a partially open position is an option that can be used with the present invention.

A second embodiment is depicted in FIGS. 11-13. This embodiment includes parts that interlock panels 16 and 18 without extra locking devices. The trailing end of forward panel 16 has a pair of rearwardly extending lips 201 formed in its opposite sidewalls; part 202 is a strengthening device for strengthening its associated lip 201. A roller 203 is rotatably mounted on the interior sidewall of each lip 201, extends inwardly therefrom, and is received within a track 204; elongate track 204 is mounted on an exterior sidewall of rear panel 18 as is best shown in FIG. 12. Rollers 203 are rotatably engaged within their associated tracks 204 by sliding forward panel 16 rearwardly into the leading end of rear panel 18. Note in FIGS. 11 and 13 that the axle of rollers 203 represents a pivot point between the two panels, and that said pivot point is rearwardly of end wall 205 (center of FIG. 11). This provides the desired clearance between the panels when they are sliding. Just as importantly, it elegantly interlocks the panels and eliminates the need for other interlocking devices. Note also that the pivot point allows facile lifting of the trailing end of the rear panel 18 when it is unlocked to allow easy clearing of the tailgate when it is desired to unlock and lower said tailgate.

This invention is clearly new and useful. Moreover, it was not obvious to those of ordinary skill in the art at the time it was made, in view of the prior art considered as a whole.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A pickup truck bed cover, comprising:
a slideably mounted forward panel;
a slideably mounted rearward panel;
a pair of elongate track members fixedly secured to opposite inner side walls of said pickup truck bed;
a first transversely disposed "U"-shaped axle member positioned at a trailing end of said rearward panel in underlying relation thereto;
a transversely disposed, linear in configuration axle member positioned at a leading end of said rearward panel in underlying relation thereto;
a second transversely disposed "U"-shaped axle member positioned at a leading end of said forward panel in underlying relation thereto;
a first pair of laterally moveable, rotatably mounted wheel members positioned at opposite ends of said first "U"-shaped axle member and rollingly engaging said track members;
a second pair of laterally moveable, rotatably mounted wheel members positioned at opposite ends of said linear axle member and rollingly engaging said track members;
a third pair of laterally moveable, rotatably mounted wheel members positioned at opposite ends of said second "U"-shaped axle member and rollingly engaging said track members;
said rearward panel being telescopically received by said forward panel when said rearward panel is unmoved and said forward panel is slid rearwardly and when said forward panel is unmoved and said rearward panel is slid forwardly;
whereby the lateral moveability of said first, second, and third pair of wheel members accommodates said truck bed cover to differing widths of truck beds.

2. The cover of claim 1, further comprising:
a first bias means for urging said first "U"-shaped axle member to urge said trailing end of said rearward panel upwardly;
a second bias means for urging said second "U"-shaped axle member to urge said leading end of said forward panel upwardly;
a first latch member for holding said first "U"-shaped axle member against the upward urging of said first bias means; and
a second latch member for holding said second "U"-shaped axle member against the upward urging of said second bias means;
whereby said trailing end of said rearward panel and said leading end of said forward panel are urged upwardly by said first and second "U"-shaped axle members only when said first and second latch members are unlatched.

3. The cover of claim 2, further comprising:
a rearward transverse lip that overhangs a tailgate member at a trailing end of said truck bed;
a forward transverse lip that overhangs a front wall at a leading end of said truck bed;
said first and second bias means being operative to lift said rearward and forward transverse lips over said tailgate member and front wall, respectively, when said rearward and forward latch members are unlatched.

4. The cover of claim 3, further comprising a pair of transversely spaced, parallel, longitudinally extending rib members formed in said forward panel.

5. The cover of claim 4, further comprising a pair of transversely spaced, parallel, longitudinally extending rib members formed in said rearward panel, said rearward panel ribs being disposed in longitudinal alignment with said forward panel ribs and said rearward panel ribs being complementally formed with respect to said forward panel ribs and being telescopically received therein.

6. The cover of claim 5, further comprising a transversely disposed roller member rotatably mounted in rolling engagement between said forward panel ribs and said rearward panel ribs, said roller member facilitating sliding movement of said forward and rearward panels with respect to one another.

7. The cover of claim 6, further comprising:
a pair of transversely spaced, longitudinally extending handle members positioned at opposite sides of said forward panel;
a first and second pair of transversely spaced boss members formed integrally with a top wall of said forward panel;
said handle members being mounted in vertically spaced relation to said top wall by said boss members.

8. The cover of claim 7, wherein said forward and rearward panels are arched, said panels having a raised center part and having top walls that slope downwardly therefrom, said arched construction strengthening said panels and providing a drainage means for moisture deposited atop said panels.

9. The cover of claim 8, further comprising a transverse gutter means formed in said leading end of said rearward panel.

10. The cover of claim 9, further comprising a detent means fixedly secured to said gutter means, said detent means overlying said roller member when said panels are disposed in fully covering relation to said truck bed, said detent means thereby precluding lifting upwardly of said forward panel trailing end when said panels are so disposed.

11. The cover of claim 10, further comprising a plurality of transversely disposed, longitudinally spaced rib members formed in said forward panel.

12. The cover of claim 11, further comprising a plurality of transversely disposed, longitudinally spaced rib members formed in said rearward panel.

13. The cover of claim 12, wherein said first latch member is positioned substantially mid-length of said first "U"-shaped axle member.

14. The cover of claim 13, wherein said second latch member is positioned on a driver's side of said second "U"-shaped axle member.

15. The cover of claim 14, wherein an access opening is formed near a trailing end of said track members to enable insertion of said wheel members into their associated track members when the forward and rearward panels are initially installed in operable relation to a truck bed and when said panels are removed therefrom.

16. The cover of claim 1, further comprising a pair of rearwardly extending lips formed in a trailing end of said forward panel at its opposite sidewalls, there being one lip per sidewall, a wheel member being rotatably mounted to each of said lips and extending inwardly therefrom, and an elongate wheel member-receiving track member mounted to an outer sidewall of said rearward panel, whereby said panels are interlocked by sliding said wheel members into said track members.

* * * * *